United States Patent
Myers et al.

(10) Patent No.: US 8,015,826 B2
(45) Date of Patent: Sep. 13, 2011

(54) ENGINE BRAKE FOR PART LOAD CO REDUCTION

(75) Inventors: Gerald A. Myers, Longwood, FL (US); David A. Little, Chuluota, FL (US)

(73) Assignee: Siemens Energy, Inc., Orlando, FL (US)

( * ) Notice: Subject to any disclaimer, the term of this patent is extended or adjusted under 35 U.S.C. 154(b) by 576 days.

(21) Appl. No.: 11/784,150

(22) Filed: Apr. 5, 2007

(65) Prior Publication Data

US 2010/0251727 A1   Oct. 7, 2010

(51) Int. Cl.
  *F02C 6/04* (2006.01)
(52) U.S. Cl. ............... 60/785; 60/782; 60/795
(58) Field of Classification Search .......... 60/782, 60/785, 795, 231, 770, 39.5
  See application file for complete search history.

(56) References Cited

U.S. PATENT DOCUMENTS

| | | | | |
|---|---|---|---|---|
| 4,149,371 A * | 4/1979 | Spraker et al. | ........ | 60/785 |
| 4,351,156 A | 9/1982 | White et al. | | |
| 4,446,692 A | 5/1984 | Adkins | | |
| 5,365,738 A * | 11/1994 | Etheridge | ........ | 60/742 |
| 5,469,700 A | 11/1995 | Corbett et al. | | |
| 5,537,864 A | 7/1996 | Sood | | |
| 6,112,513 A * | 9/2000 | Catt et al. | ........ | 60/204 |
| 6,226,974 B1 | 5/2001 | Andrew et al. | | |
| 6,487,863 B1 * | 12/2002 | Chen et al. | ........ | 60/782 |
| 6,550,253 B2 * | 4/2003 | Mortzheim et al. | ........ | 60/782 |
| 6,679,048 B1 * | 1/2004 | Lee et al. | ........ | 60/204 |
| 6,758,032 B2 * | 7/2004 | Hunter et al. | ........ | 60/231 |
| 6,796,129 B2 | 9/2004 | Yee et al. | | |
| 6,840,049 B2 * | 1/2005 | Ziegner | ........ | 60/782 |
| 6,968,696 B2 | 11/2005 | Little | | |
| 6,978,621 B2 * | 12/2005 | Bunker et al. | ........ | 60/782 |
| 7,000,404 B2 * | 2/2006 | Palmisano et al. | ........ | 60/782 |
| 7,007,488 B2 * | 3/2006 | Orlando et al. | ........ | 60/782 |
| 7,032,388 B2 | 4/2006 | Healy | | |
| 7,124,591 B2 | 10/2006 | Baer et al. | | |
| 7,698,898 B2 * | 4/2010 | Eluripati et al. | ........ | 60/785 |
| 7,707,838 B2 * | 5/2010 | Sheldon et al. | ........ | 60/785 |
| 7,708,518 B2 * | 5/2010 | Chehab | ........ | 415/115 |
| 7,716,930 B2 * | 5/2010 | Chillar et al. | ........ | 60/728 |
| 7,721,554 B2 * | 5/2010 | Balan et al. | ........ | 60/785 |
| 7,818,970 B2 * | 10/2010 | Price et al. | ........ | 60/782 |
| 2004/0011056 A1 | 1/2004 | Yee et al. | | |
| 2005/0050899 A1 | 3/2005 | Little | | |
| 2005/0050901 A1 | 3/2005 | Little | | |
| 2005/0166595 A1 | 8/2005 | Fletcher et al. | | |
| 2006/0042258 A1 | 3/2006 | Gadde et al. | | |
| 2006/0080965 A1 | 4/2006 | Healy | | |
| 2010/0175387 A1 * | 7/2010 | Foust et al. | ........ | 60/782 |

* cited by examiner

Primary Examiner — William H Rodriguez

(57) ABSTRACT

Aspects of the invention relate to a system and method for operating a turbine engine assembly. The turbine engine assembly has a turbine engine having a compressor section, a combustor section and a turbine section. The combustor section has a lower T_PZ limit and the turbine engine has a design load. The assembly further includes at least one air bleed line from the compressor and at least one valve for controlling air flow through the bleed line. Control structure is provided for opening the valve to allow bleed air to flow through the bleed line when an operating load is less than the design load. The flow rate through the bleed line is increased as the operating load is decreased, reducing the power delivered by the turbine assembly while maintaining the T_PZ above a lower T_PZ limit. A method for operating a turbine engine assembly is also disclosed.

16 Claims, 5 Drawing Sheets

ENGINE BRAKE FOR PART LOAD CO REDUCTION

FIELD OF THE INVENTION

Aspects of the invention relate in general to turbine engines and, more particularly, to part load CO reduction in a turbine engine.

BACKGROUND OF THE INVENTION

Turbine engines, such as single shaft industrial gas turbines, are designed to operate at a constant design turbine inlet temperature under any ambient air temperature (i.e., the compressor inlet temperature). This design turbine inlet temperature allows the engine to produce maximum possible power, known as base load. Any reduction from the maximum possible base load power is referred to as part load operation. In other words, part load entails all engine operation from 0% to 99.9% of base load power.

Part load operation may result in the production of high levels of carbon monoxide (CO) during combustion. One known method for reducing part load CO emissions is to bring the combustor exit temperature or the turbine inlet temperature near that of the base load design temperature. It should be noted that, for purposes of this disclosure, the terms combustor exit temperature and turbine inlet temperature are used interchangeably. In actuality, there can be from about 30 to about 80 degrees Fahrenheit difference between these two temperatures due to, among other things, cooling and leakage effects occurring at the transition/turbine junction. However, with respect to aspects of the present invention, this temperature difference is insubstantial.

To bring the combustor exit temperature closer to the base load design temperature, mass flow of air through a turbine engine can be restricted by closing the compressor inlet guide vanes (IGV), which act as a throttle at the inlet of the compressor. When the IGVs are closed, the trailing edges of the vanes rotate closer to the surface of an adjacent vane, thereby effectively reducing the available throat area. Reducing the throat area reduces the flow of air which the first row of rotating blades can draw into the compressor. Lower flow to the compressor leads to a lower compressor pressure ratio being established in the turbine section of the engine. Consequently, the compressor exit temperature decreases because the compressor does not input as much energy into the incoming air. Also, the mass flow of air through the turbine decreases, and the combustor exit temperature increases.

Some of the compressor exit air is used to cool structure of the turbine. This structure can include the outer casing, blade rings, and ring segments. In addition, some compressed air is piped directly out of the compressor through piping. This air is routed out of the engine, passed through a cooling circuit, and is ultimately redelivered to the engine at a substantially constant design cooling air temperature. The cooling circuit can include heat exchanger devices as well as valves for controlling the quantity of air passing through or bypassing the heat exchanger devices so as to achieve the design cooling air return temperature. The design temperature is held substantially constant so that the metal temperatures of the parts being cooled are held substantially constant, thereby maintaining the life of such parts. The design cooling return temperature can be specific to a particular engine design. This compressor bleed air is used to cool the stationery support structure near the second third and fourth rows of blades and is supplied through piping.

CO increases rapidly as gas turbine engine load is reduced below approximately 60%. Once IGVs have been closed to their limit, and the engine's exhaust temperature limit has been reached, then power can be reduced only by decreasing turbine inlet temperature (TIT). TIT reduction drops the combustion system's primary zone temperature (T_PZ), and CO and unburned hydrocarbons (UHC) are produced due to quenching of the combustion reactions in the turbine hot gas path. To prevent CO from increasing as engine load decreases, T_PZ must be maintained at a high level.

SUMMARY OF THE INVENTION

Aspects of the invention relate to a system and method for operating a turbine engine assembly. The turbine engine assembly has a turbine engine having a compressor section, a combustor section and a turbine section. The combustor section has a lower T_PZ limit and the turbine engine has a design load. The assembly further includes at least one air bleed line from the compressor and at least one valve for controlling air flow through the bleed line. Control structure is provided for opening the valve to allow bleed air to flow through the bleed line when an operating load is less than the design load. The flow rate through the bleed line is increased as the operating load is decreased, reducing the power delivered by the engine assembly while maintaining the T_PZ above a lower T_PZ limit.

Another aspect of the invention is directed to a method of operating a turbine engine assembly, the turbine engine assembly comprising a compressor section, a combustor section, and a turbine section. The combustor section has a lower T_PZ limit. The method includes sensing the load on the turbine engine assembly for a reduced operating load; and bleeding air from the compressor section responsive to the reduced operating load. The flow rate of the bleed air is increased as the operating load is decreased, reducing the power delivered by the turbine assembly and maintaining the T_PZ above the lower T_PZ limit.

DETAILED DESCRIPTION OF EMBODIMENTS OF THE INVENTION

Figure 1:
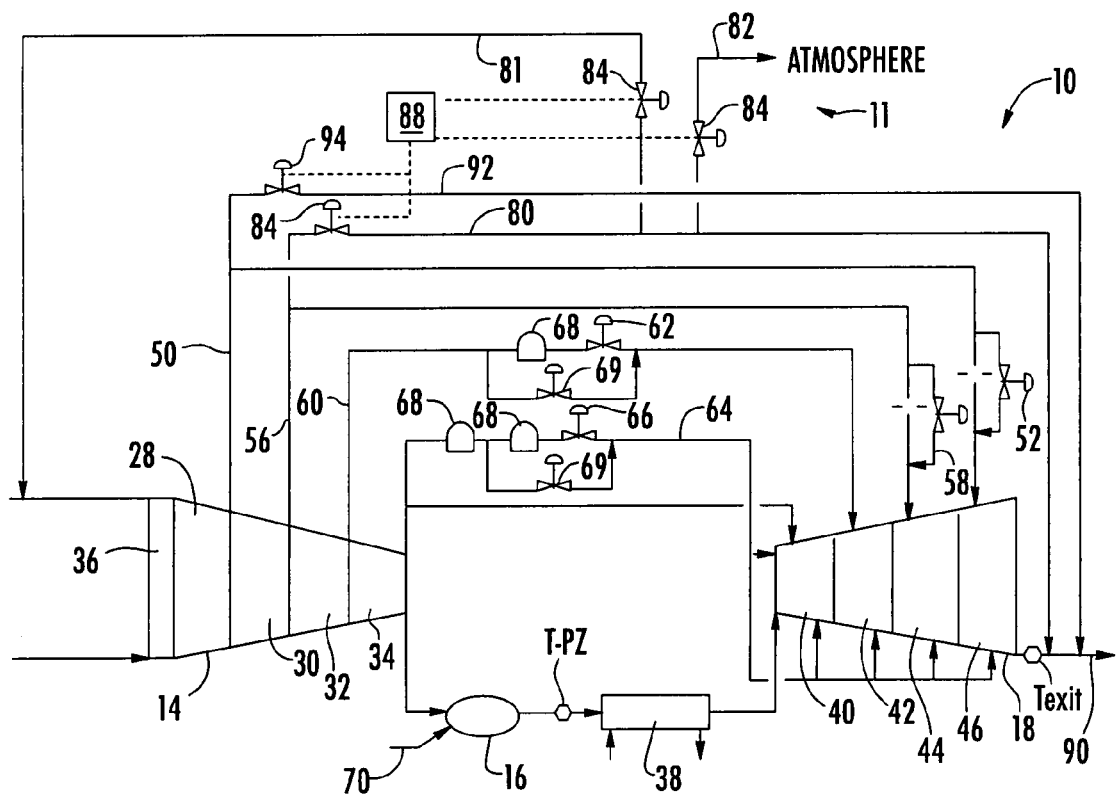
FIG. 1 is a schematic diagram of a turbine engine assembly according to an exemplary embodiment of the invention.
Figure 2:
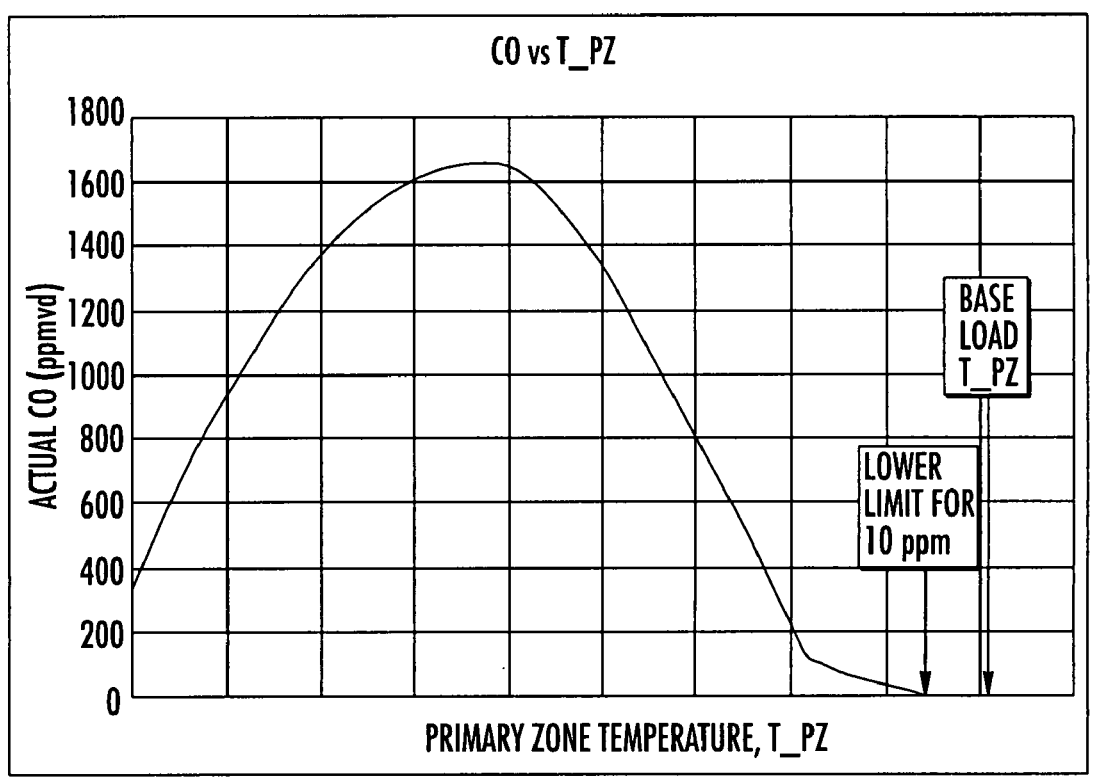
FIG. 2 is a graphical illustration of CO vs T_PZ.

Embodiments of the invention are directed to a turbine engine assembly 10 having a compressor section 14, a combustor section 16, and a turbine section 18. As is known in the art, the compressor 14 can have one or more stages such as front stages 28, forward stages 30, middle stages 32, and rear stage 34. Also, the compressor 14 can have inlet guide vanes (IGV) 36 which can be opened and closed or otherwise adjusted to control the mass flow of air into the compressor 14. It should be understood that turbine assembly 10 can have other vane assemblies and other assemblies that provide for flow control, including variable stator vanes. The combustor section 16 is shown as a single unit, but it should be understood that in most turbine engines the combustor section 16 can comprise a plurality of combustion chambers. A transition section or structure 38 can be provided for directing of the combustion flow. The turbine section can comprise one or more stages such as first stage 40, second stage 42, third stage 44, and fourth stage 46.

Embodiments of the invention will be explained in the context of an exemplary CO reduction system, but the detailed description is intended only as exemplary. Embodiments of the invention are shown or represented in FIGS. 1-5, but aspects of the invention are not limited to the illustrated structure or application. As described in detail in the following exemplary embodiment, flow control in the turbine engine assembly 10 through use of bleed valves, adjustable IGVs and the like is utilized to control CO emissions. However, the present disclosure contemplates other components, structures, devices and/or methodologies to be utilized in addition to, or in place of, one or more of the components described herein for flow control in the turbine.

In the turbine engine assembly 10, piping, e.g., external piping, can be used for removal of air streams from the compressor 14 to put such air streams to use elsewhere in the turbine engine, such as, for example, cooling of various components. A low pressure (LP) vane air line 50 controlled by suitable valving 52 can remove air from a low pressure area of the compressor 14 such as front stages 28. A high pressure (HP) vane air line 56 controlled by suitable valving 58 can remove air from an intermediate pressure area of the compressor 14 such as forward stages 30. A very high pressure vane air line 60 controlled by suitable valving 62 and 69 can remove air from a high pressure area of the compressor 14 such as middle stages 32. Air from the lines 50, 56 and 60 can be routed to the turbine section 18 to cool various features and structure of the turbine section, such as the vanes (not shown).

The turbine engine assembly 10 can have an LP bleed path 92 from the LP vane air path 50. LP bleed path 92 can also be a separate and independent line taken from a low pressure area of the compressor 14 such as the front stages 28. Air can exit the LP bleed path 92 into the exhaust flow 90 of the turbine 18. Flow through the LP bleed path 92 can be regulated by suitable valving 94, which can be controlled by the controller 88 or a different controller. Once at operating conditions, the LP bleed path 92 can be closed through use of valving 94.

One or more heat exchangers 68 can be provided in thermal communication with the air flowing through the lines 50, 56 and 60 (shown only with respect to line 60) such as, for example, for cooling of the air. Bypass valving 69 can be utilized for control of the amount of heat exchange between the lines 50, 56 and 60 and the heat exchangers 68, such as, for example, temperature control. Output from the compressor 14 can be routed to the combustor section 16, can bypass the combustor directly to the turbine 18, and/or can be passed through heat exchangers 68 and then to the turbine. For example, a line 64 from the outlet of the compressor 14 can supply a cooling air stream from the compressor, through heat exchangers 68, and to the turbine 18.

In the combustor section 16, air can be mixed with fuel, such as through a line 70, and combusted to produce hot, high pressure gas and reaction products including unburned hydrocarbons (UHC) and CO. It is desirable to keep CO emissions low, preferably less than 10 ppmvd at 15% $O_2$. As the load on the turbine engine assembly 10 is reduced, the fuel supply to the combustors is reduced. The IGVs 36 can be closed as the fuel supply is reduced to limit the mass flow of air into the combustors 16. Further reductions in power would require a reduction in T_PZ, which results in increased UHC and CO production (FIG. 2) due to the quenching of the combustion reactions in the turbine hot gas path. CO can usually only be maintained at a low level (less than about 10 ppmvd at 15% $O_2$) above about a 60% load.

According to an exemplary embodiment of the invention, a CO reduction system 11 can have a high pressure (HP) bleed path 80. The HP bleed path 80 can be taken from the HP vane air line 56 as shown, or can be a separate and independent line taken from an intermediate pressure area of the compressor 14 such as the forward stage 30. Flow through the HP bleed path 80 can be regulated by suitable valving 84 or other flow control device, which can be controlled by a suitable controller 88. Air can exit the HP bleed path 80 into the exhaust flow 90 of the turbine 18, or at another location, including the engine inlet and/or the atmosphere.

In one embodiment, the HP bleed air can be directed by controller 88 to any one of, or a combination of, the exhaust flow 90, the engine inlet and the atmosphere. Suitable valving 84 and piping, such as lines 80, 81, 82, can be used to direct the bleed air to the desired location. During the CO reduction process, the compressor 14 has compressed the bleed air that exits through the HP bleed path 80. The power required for this compression is supplied by the turbine 18, and since the turbine power stays constant, less power is available to drive the generator or other load, i.e., the power is absorbed. Where the bleed air is directed to the turbine engine inlet through line 81, power absorption is further enhanced by warming of the inlet air and/or reducing of the air density.

Figure 3:
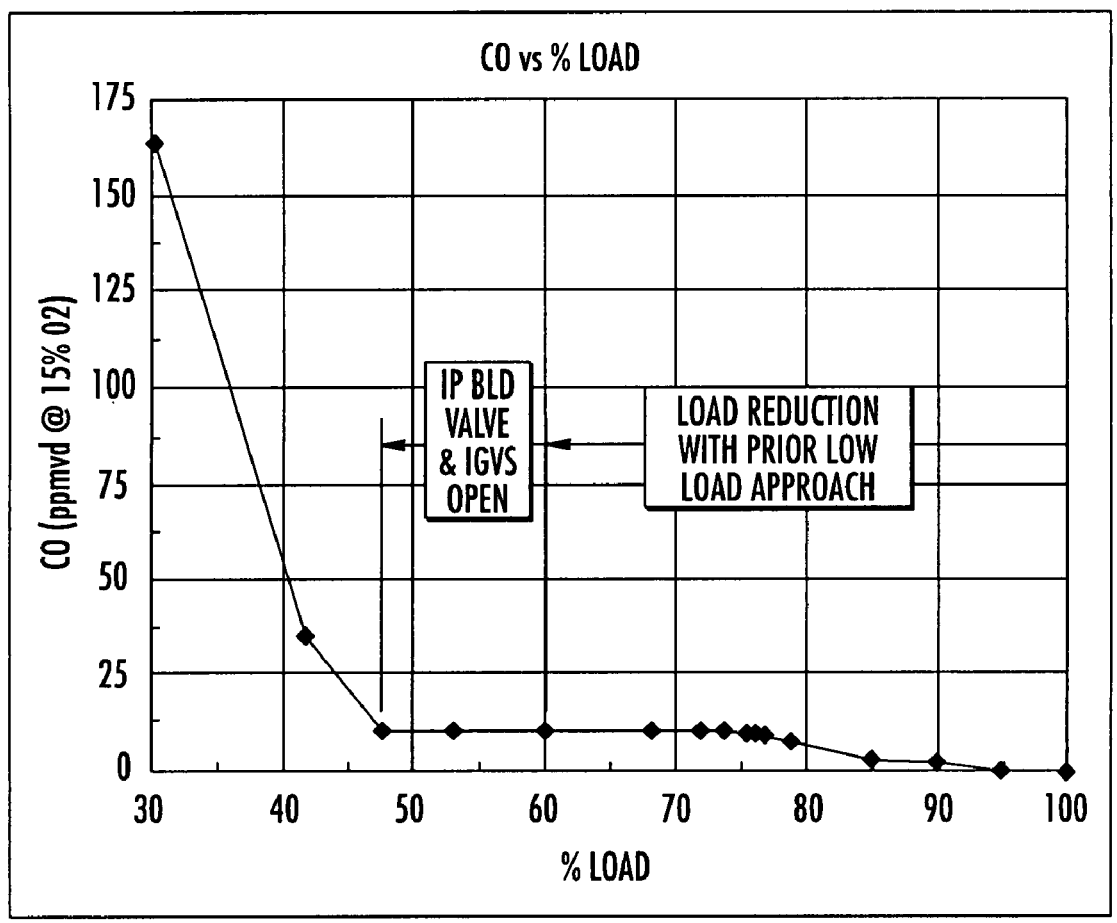
FIG. 3 is a graphical illustration of CO vs percent load of the turbine engine.

During the CO reduction process, the IGVs 36 and the HP bleed path 80 can be opened in parallel, such that additional flow drawn into the compressor 14 is dumped out through the HP bleed path. The total turbine flow can be held constant by returning the bleed air to the exhaust flow 90. Load at the generator is thereby reduced while operating the combustors 16 at a constant T_PZ where low emissions are possible (FIG. 3). Low CO emissions may be achieved for reduced loads, such as, for example, for loads down to about 48%, as shown in FIG. 3.

The controller 88 is provided to control flow through the HP bleed path 80 according to the load demand on the turbine engine assembly 10. The controller 88 can be any suitable controller, such as a programmable logic controller (PLC), a computer or the like, and can be a programmed function of the existing control system of the turbine engine assembly 10 or a separate controller as shown.

Figure 4:
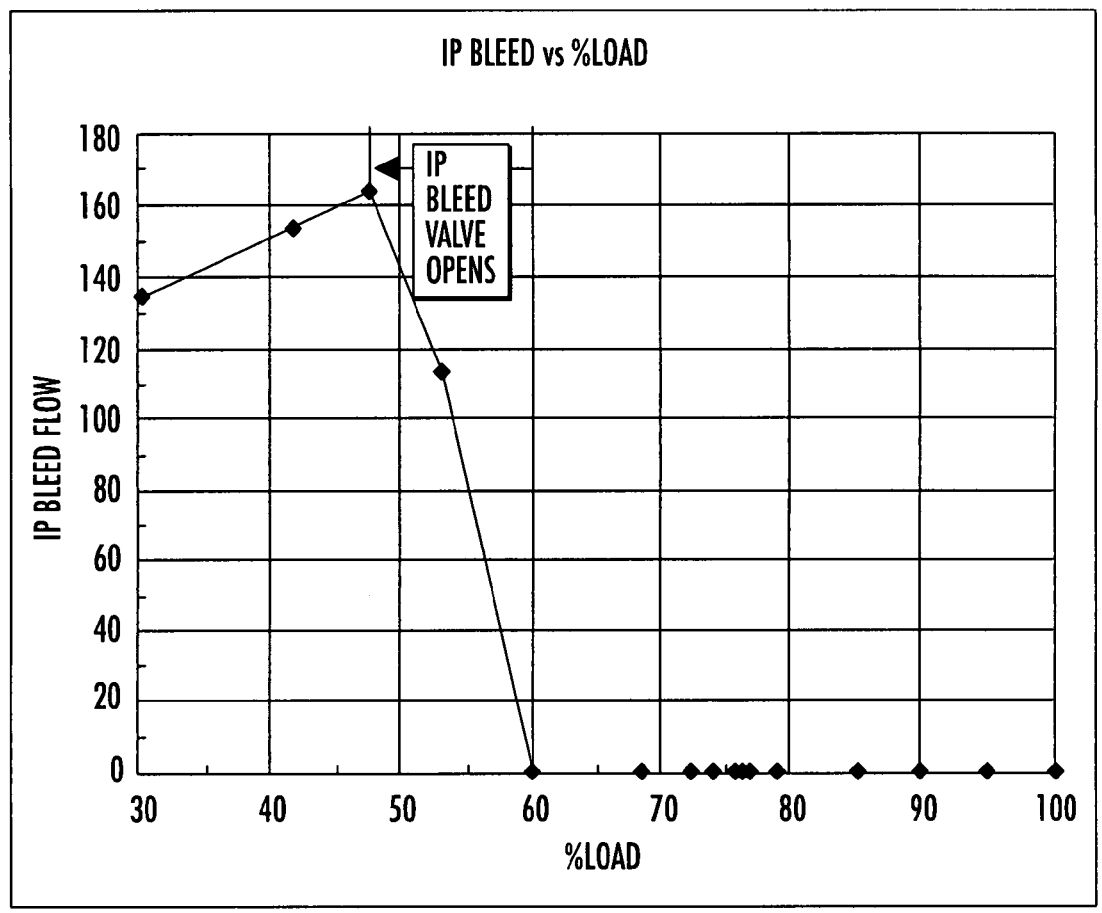
FIG. 4 is a graphical illustration of IP bleed flow vs percent load of the turbine engine.
Figure 5:
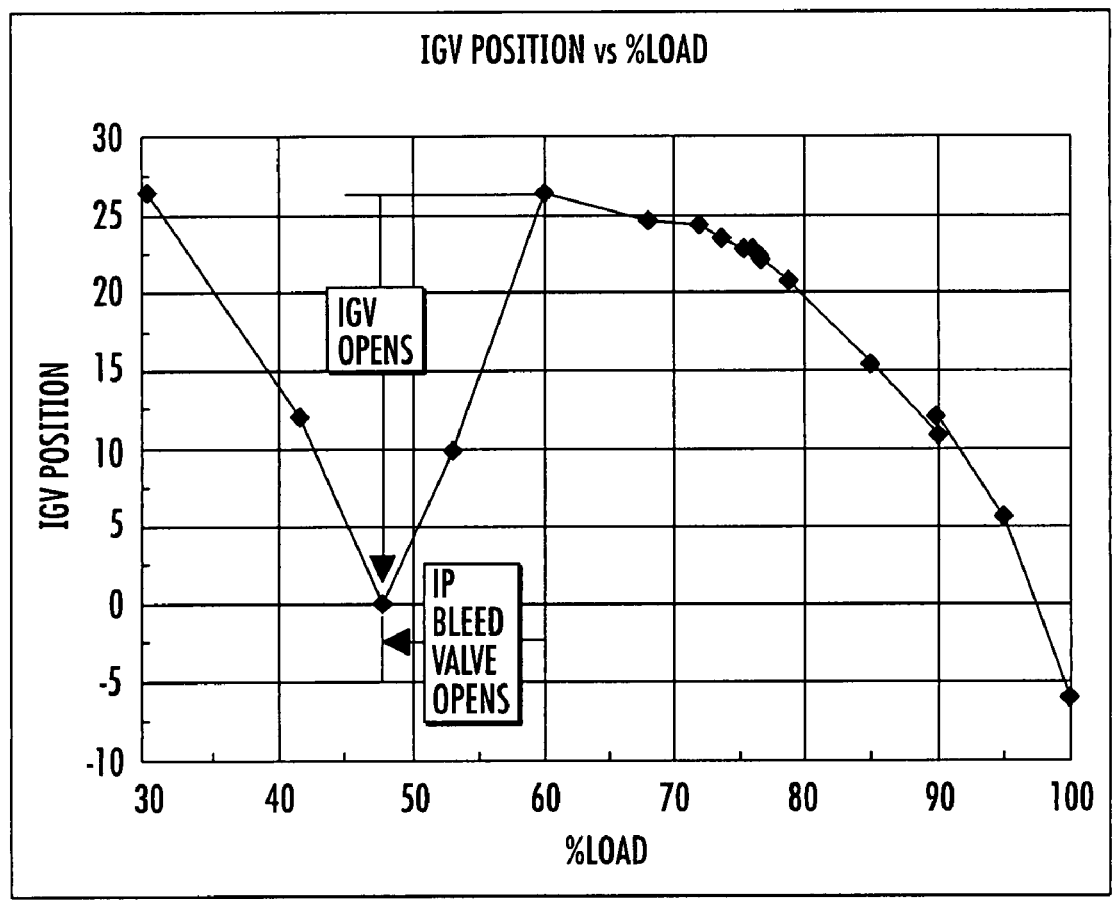
FIG. 5 is a graphical illustration of inlet guide vane (IGV) position vs percent load of the turbine engine.

In one exemplary embodiment, the controller 88 opens the HP bleed path 80 as the load on the turbine engine 10 decreases. The IGVs 36 can be first closed to the limiting position for initial decrease of the load. As the load is then decreased further, the HP bleed path 80 can be opened. FIG. 4 illustrates the HP bleed flow being increased as the load decreases to 48%. The IGVs 36 can be opened as the bleed flow increases through the HP bleed path 80, as shown in FIG. 5.

In one embodiment, the IGVs 36 close initially as the load decreases, until about 60% load is reached, where the IGVs 36 are at a limit closed position. The IGVs 36 then open as the load decreases further, and the IP bleed path 80 is also opened. At 48% load the HP bleed flow is at a maximum open condition. Further reductions in load can be accomplished by closing of the IGVs 36.

At 48% load, HP bleed flow is equivalent to about 15% of the compressor inlet flow. In this exemplary embodiment, turbine assembly 10 maintains the T_PZ above the T_PZ lower limit at which an undesirable level of CO would be produced, for example less than 10 ppmvd at 15% $O_2$, until a lower load threshold is reached at which point the T_PZ lower limit is breached.

The exemplary embodiment of turbine engine assembly 10 describes a bleed air configuration utilizing bleed paths 80 and 92. It should be understood that the present disclosure contemplates other configurations, components and/or methodologies for directing compressed fluid to bypass the combustor and/or turbine so that power is absorbed rather than supplied to the generator in order to reduce CO emissions at low load conditions. The particular stage of compression for removal of the compressed fluid can be chosen to facilitate the power absorption and better control the CO emission reduction.

In one embodiment, the conditions through the combustor 16 and turbine 18 are held substantially constant at the min T_PZ desired, e.g., 10 CO ppmvd at 15% $O_2$, and the IGVs and HP bleed valve are opened together to draw additional air into, and dump this additional air, from the compressor 14. This allows for dropping of the engine power when the turbine exhaust temperature limit $T_{exit}$ has been reached. This process keeps engine conditions downstream of the compressor stages 30 constant. The additional power that is needed to compress this additional air is supplied by the turbine (turbine section power is constant), leaving less power to drive the generator. This additional power absorbed within the engine (additional air passed through compressor stages 28 and 30) acts as an air brake for the turbine assembly 10.

The foregoing description is provided in the context of one possible bleed flow in a turbine engine. Aspects of the invention are not limited to the examples presented herein. Thus, it will of course be understood that the invention is not limited to the specific details described herein, which are given by way of example only, and that various modifications and alterations are possible within the scope of the invention as defined in the following claims.

What is claimed is:

1. A turbine engine assembly for a generator, the assembly comprising:
    a turbine engine having a compressor section, a combustor section and a turbine section, the combustor section having a primary zone temperature and the turbine engine having a design load;
    at least one air bleed line in communication with the compressor section;
    at least one valve for controlling air flow through the at least one air bleed line;
    a plurality of inlet guide vanes in the compressor section;
    a controller that upon sensing a decreased operating load first closes the inlet guide vanes and then, in parallel, opens the at least one valve to allow bleed air to flow through the at least one air bleed line and opens the inlet guide vanes to increase compressor inlet flow when an operating load is less than the design load, wherein a flow rate through the at least one air bleed line is increased and compressor inlet flow is increased as the operating load is decreased thereby reducing power delivered to the generator while maintaining the primary zone temperature above a primary zone temperature lower limit, whereby additional inlet flow drawn into the compressor section is dumped out through the bleed line.

2. The turbine engine assembly of claim 1, wherein the at least one air bleed line is a high pressure bleed line.

3. The turbine engine assembly of claim 1, wherein the primary zone temperature lower limit is selected so as to maintain CO production at less than about 10 ppmvd at 15% $O_2$.

4. The turbine engine assembly of claim 1, wherein flow through the at least one air bleed line is supplied to at least one of exhaust flow from the turbine engine, an inlet of the turbine engine and atmosphere.

5. A CO reduction system for a turbine engine operably coupled to a generator, the system comprising:
    a bleed line in communication with a compressor section of the turbine engine;
    a flow control device for controlling flow through the bleed line;
    a plurality of inlet guide vanes in the compressor section;
    a controller that upon sensing a decreased operating load first closes the inlet guide vanes and then, in parallel, actuates the flow control device to allow bleed air to flow through the bleed line and opens the inlet guide vanes to increase compressor inlet flow when an operating load is less than a design load of the turbine engine, wherein a flow rate through the bleed line is increased and compressor inlet flow is increased as the operating load is decreased thereby reducing power delivered to the generator while maintaining the primary zone temperature above a primary zone temperature lower limit, whereby additional inlet flow drawn into the compressor section is dumped out through the bleed line.

6. The system of claim 5, wherein the bleed line is a high pressure bleed line.

7. The system of claim 5, wherein the primary zone temperature lower limit is selected so as to maintain CO production at less than about 10 ppmvd at 15% $O_2$.

8. The system of claim 5, wherein flow through the bleed line is supplied to atmosphere.

9. The system of claim 5, wherein flow through the bleed line is supplied to exhaust flow from the turbine engine.

10. The system of claim 5, wherein flow through the bleed line is supplied to an inlet of the turbine engine.

11. A method of operating a turbine engine assembly comprising:
    sensing a load on a turbine engine for a reduced operating load;
    closing inlet guide vanes responsive to the reduced operating load;
    after inlet guide vanes have been closed, bleeding air from a compressor section of the turbine engine and in parallel opening the inlet guide vanes responsive to the reduced operating load, wherein a flow rate of bleed air is increased as the operating load is decreased and, in parallel, compressor inlet flow is increased thereby reducing power delivered to a generator and maintaining a primary zone temperature of a combustor section above a primary zone temperature lower limit.

12. The method of claim 11, further comprising bleeding the air from a high pressure region of the compressor.

13. The method of claim 11, further comprising selecting the primary zone temperature lower limit so as to maintain CO production at less than a desired limit.

14. The method of claim 11, further comprising directing the bleed air to exhaust flow of the turbine engine.

15. The method of claim 11, further comprising directing the bleed air to an inlet of the turbine engine.

16. The method of claim 11, further comprising directing the bleed air to atmosphere.

* * * * *